United States Patent
Fisher et al.

(10) Patent No.: US 6,246,987 B1
(45) Date of Patent: *Jun. 12, 2001

(54) SYSTEM FOR PERMITTING ACCESS TO A COMMON RESOURCE IN RESPONSE TO SPEAKER IDENTIFICATION AND VERIFICATION

(75) Inventors: Thomas D. Fisher, Plano; Dearborn R. Mowry, Irving; Jeffrey J. Spiess, Lewisville, all of TX (US)

(73) Assignee: Alcatel USA Sourcing, L.P.

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/018,433
(22) Filed: Feb. 4, 1998
(51) Int. Cl.[7] .................................. G10L 17/00
(52) U.S. Cl. ..................... 704/273; 704/247; 704/252
(58) Field of Search ........................ 704/273, 275, 704/270, 246, 247, 248, 252

(56) References Cited

U.S. PATENT DOCUMENTS

| | | | |
|---|---|---|---|
| 3,752,904 | * 8/1973 | Waterbury | 348/13 |
| 4,363,102 | * 12/1982 | Holmgren et al. | 704/238 |
| 5,091,947 | * 2/1992 | Ariyoshi et al. | 704/246 |
| 5,165,095 | * 11/1992 | Borcherding | 379/88.03 |
| 5,212,832 | * 5/1993 | Ness-Cohn | 455/514 |
| 5,297,183 | * 3/1994 | Bareis et al. | 455/410 |
| 5,375,244 | * 12/1994 | McNair | 710/200 |
| 5,430,827 | * 7/1995 | Rissanen | 704/272 |
| 5,719,921 | * 2/1998 | Vysotsky et al. | 379/88.01 |
| 5,758,317 | * 5/1998 | Peterson et al. | 704/247 |
| 5,758,322 | * 5/1998 | Rongley | 704/275 |
| 5,832,063 | * 11/1998 | Vysotsky et al. | 379/88.03 |

* cited by examiner

*Primary Examiner*—William R. Korzuch
*Assistant Examiner*—Abul K. Azad
(74) *Attorney, Agent, or Firm*—Anderson, Levine & Lintel,

(57) ABSTRACT

A method of accessing a resource, where the resource is accessible by a plurality of authorized persons. The method receives a signal representative of a first utterance from a first person, wherein the first utterance represents information. In response to the signal representative of a first utterance from a first person, the method determines with a computer system whether the first person is one of the plurality of authorized persons. The method also receives a signal representative of a first utterance from a second person, where the signal representative of a first utterance from a second person represents the same information as the information represented by the signal representative of a first utterance from the first person. In response to the signal representative of the first utterance from the second person, the method determines with the computer system whether the second person is one of the plurality of authorized persons.

32 Claims, 3 Drawing Sheets

SYSTEM FOR PERMITTING ACCESS TO A COMMON RESOURCE IN RESPONSE TO SPEAKER IDENTIFICATION AND VERIFICATION

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to speech recognition, and are more particularly directed to a system for permitting access to a common resource in response to speaker identification and verification.

Over the past decade, speech recognition in computers has dramatically improved. This improvement has led to various applications of speech recognition, such as telephony operations and apparatus control. Spoken name speed dialing is an example of speech recognition in telephony operations. In spoken name speed dialing, a computer maintains a directory which includes numbers frequently called by a caller, and for each such number the directory further includes a representation of the caller's voice speaking a name corresponding to the telephone number. A caller may then call a number identified in the directory by merely speaking the corresponding name into the phone, assuming that the spoken name matches an entry in the directory. For example, a call can be placed by saying "call the boss" or some other utterance into the phone microphone, in response to which the phone system will dial the corresponding number for the uttered name. Door access is an example of speech recognition for apparatus control. In such a system, a computer maintains a directory including voice representations for each person having authority to control the door by way of voice recognition. A user may then control the door (e.g., gain access to the room or building via the door) by uttering information into a microphone, assuming that the spoken information matches an entry in the directory. The spoken information may be the user's name, although a name may be too short for robust speaker verification. Thus, as an alternative, the information may be some type of code which is anticipated as sufficiently long in duration to permit proper verification.

One particular context in which voice recognition may have particular benefits is access to a common resource by multiple persons. The resource may arise in telephony or control apparatus. As an example, assume that a selected group of employees of an office environment are authorized to place long distance calls through a single telephone account number. Assume further that such access is desired via speech recognition. Thus, when the system operates properly, only those authorized employees are permitted to make long distance telephone calls, whereas non-authorized persons (i.e., either in the office or outside of the office) are rejected by the system. This type of group access scenario is addressed by the present inventive embodiments. Thus, before proceeding with a detailed analysis of those embodiments, it is first instructive to examine some potential alternative approaches as may be contemplated by one skilled in the art.

In the above example as well as in comparable group access scenarios, a non-speech recognition approach as may be contemplated by one skilled in the art is to require all members of the group to remember a personal identification number (PIN) to be entered on the touch tone pad of a telephone. Such an approach, however, has at least two drawbacks. First, the user is required to remember particularized information (e.g., PIN) which may be forgotten by, or at least burdensome to, the user. Second, a PIN approach may not be sufficiently secure since an unauthorized person may obtain the PIN and use it to gain fraudulent access to the system. Third, such an approach is not a speech recognition based system and, thus, is not suitable where speech recognition is either desired or mandated as the control technique to be imposed on the group.

Also in the above example and in other group access scenarios, a speech recognition approach as may be contemplated by one skilled in the art is to use a "speaker verification" approach for each member in the group. Under such an approach, each speaker would be required to provide an utterance sufficient to perform speaker verification on that utterance, with the term speaker verification being understood in the art. For speaker verification, the speaker must enroll a single phrase into a system, typically by repeating the same utterance multiple times, which then uses a speaker verification model based on the enrolled utterances to form a speaker verification template. This template therefore includes only a vocabulary corresponding to the single utterance, and is tightly constrained to permit only on the order of a one to three percent speaker impostor acceptance (i.e., an acceptance of either an inaccurate utterance from the authorized speaker or of either an accurate or inaccurate utterance from an unauthorized speaker). Once the template is formed, the speaker thereafter could have access to the resource by again stating an utterance which is then compared, using a speaker verification algorithm, to the speaker verification template. While this approach is one which could be devised by one skilled in the art, note that it provides various drawbacks in the context of a group of persons having access to the same resource. For example, returning to the scenario above where selected employees desire to access a long distance account, note that after all of the selected employees are enrolled, each time access is attempted this approach is required to perform a speaker verification for an utterance against all speaker verification templates in the system. For example, if there are 100 authorized employees, then when one employee attempts access to the resource by stating an utterance, then that utterance would be analyzed against 100 corresponding speaker verification templates. However, as known in the art as performance typical of today's hardware and algorithms, a single speaker verification analysis takes typically on the order of one-half to one time the period of the utterance. Thus, for an utterance of one second, then a serial analysis of that utterance against 100 corresponding speaker verification templates would require between 50 (i.e.,½* 1 second utterance) and 100 (i.e., 1*1 second utterance) seconds. For various applications, this time period is far too long. Additionally, if the speaker verification analyses are done in parallel fashion, then the complexity for such an approach is vastly increased. As still another drawback to this approach, if numerous (e.g., 100) speaker verification templates are analyzed, then the overall impostor rate is increased given the one to three percent impostor rate for each separate analysis.

In view of the above, there arises a need to address the drawbacks of the above approaches and provide an improved system for permitting access to a common resource in response to speaker utterances.

BRIEF SUMMARY OF THE INVENTION

In one embodiment, there is a method of accessing a resource, where the resource is accessible by a plurality of authorized persons. The method receives a signal representative of a first utterance from a first person, where the first utterance represents information. In response to the signal representative of a first utterance from a first person, the method determines with a computer system whether the first person is one of the plurality of authorized persons. The method also receives a signal representative of a first utterance from a second person, where the signal representative of a first utterance from a second person represents the same information as the information represented by the signal representative of a first utterance from the first person. In response to the signal representative of the first utterance from the second person, the method determines with the computer system whether the second person is one of the plurality of authorized persons.

In another aspect, a method of the preferred embodiment receives a signal representative of a first utterance from a first person, a signal representative of a first utterance from a second person, and a signal representative of a second utterance from the first person. Additionally, the method determines with a computer system whether the first person is one of the plurality of authorized persons by determining an index identifying the first person by comparing the signal representative of the second utterance from the first person with each of a plurality of speaker dependent templates using speaker dependent recognition. In still another aspect, the computer system determines whether the first person is one of the plurality of authorized persons further by selecting a speaker verification template corresponding to the index, and then comparing the selected speaker verification template with the signal representative of the first utterance from the first person using speaker verification.

Other circuits, systems, and methods are also disclosed and claimed.

DETAILED DESCRIPTION OF THE INVENTION

Figure 1:
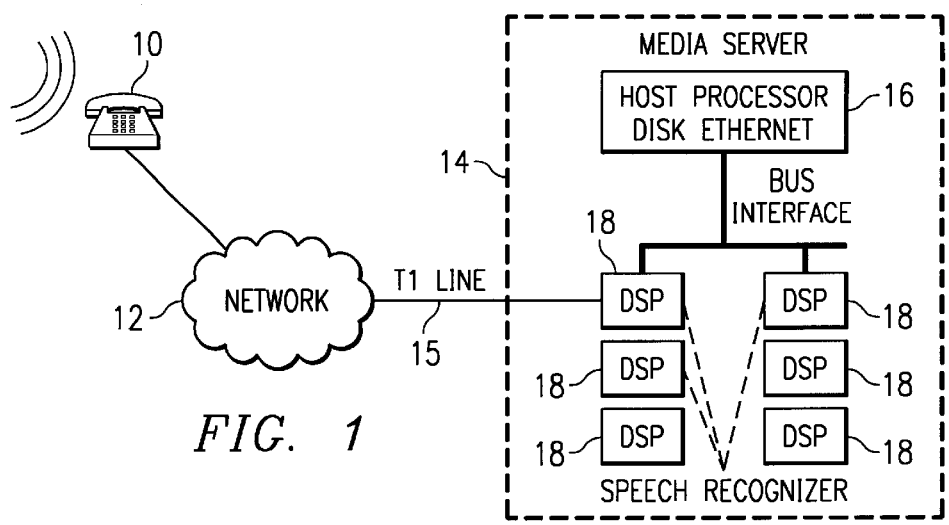
FIG. 1 illustrates a block diagram of a voice utterance analysis system.

FIG. 1 illustrates a block diagram of a voice recognition system for voice utterance analyses in a telephony environment. A telephone 10 is coupled to a telecommunications network 12. Telecommunications network 12 is coupled to a media server 14 via a digital carrier 15, such as a T1 line. Media server 14 may be a general purpose workstation and has a bus interface which permits its processing circuitry 16 (including one or more processors, hard drives and communications interfaces) to communicate with a plurality of DSPs (digital signal processors) 18.

As a matter of introduction to its operation in the preferred embodiment, the voice recognition system works as follows. Initially, a control operation occurs to indicate that an attempt to access a group accessible resource is desired by the caller where it is assumed that the caller has earlier enrolled in the system as detailed later. For example, such a control may occur when the caller dials a particular telephone number, or merely in response to an off-hook condition at telephone 10. Of course, where the present embodiments are implemented in a non-telephony context, a different procedure may commence the relevant operations. Returning to the present example, at this point and preferably in response to a first prompt, the caller speaks a first utterance, such as an identifier of the resource to be accessed. Carrying forward the example of a user seeking to access a long distance account, the identifier may be the long distance account number. The first utterance is transmitted to telecommunications network 12 where the signal is digitized and multiplexed signal onto digital carrier 15. Next and preferably in response to a second prompt, the caller speaks a second utterance which is unique to the speaker, such as the caller's name. Again, the second utterance results in a digitized and multiplexed onto digital carrier 15. Given the preceding, media server 14 receives the voice signals from the caller as digitized audio data over digital carrier 15. As detailed below, in response to this receipt, media server 14 analyzes the data corresponding to the first and second utterances to determine whether the caller is authorized to access the account. If so, access is permitted. As one example, such access may then be granted by having media server 14 then output DTMF (dual tone multi frequency) tones needed to call an additional destination to complete the call, and at the same time indicating to the caller that access has been granted. To the contrary, if access is not permitted, then media server 14 does not further connect the user to the resource and may further indicate the denial by way of a message to the caller.

Figure 2:
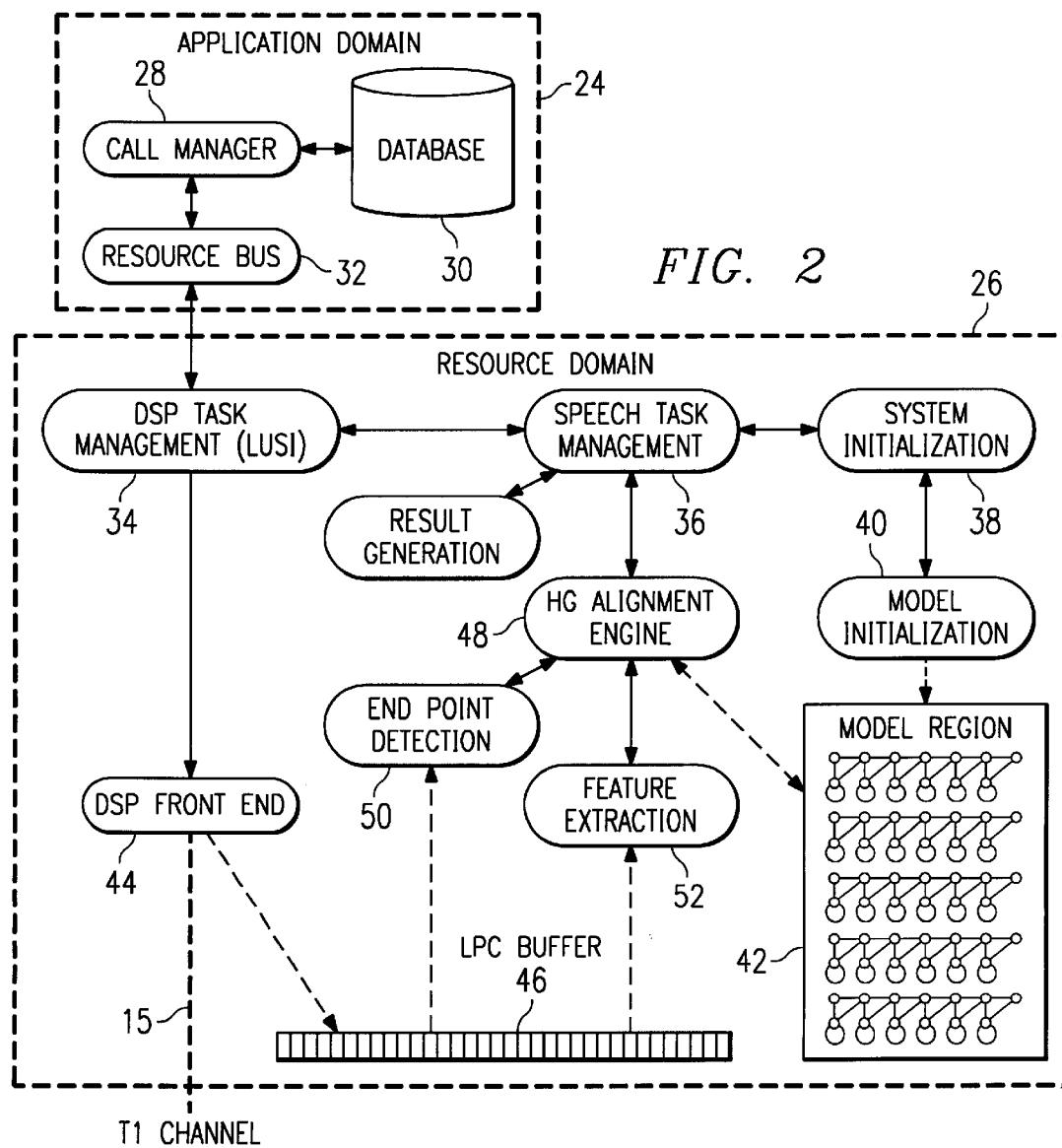
FIG. 2 illustrates a functional diagram of the system of FIG. 1 at the host level.

FIG. 2 illustrates a functional block diagram of the operation of media server 14 at the host level. For illustration purposes, the functions of the media server 14 are separated into an application domain 24 and a resource domain 26. In application domain 24, a call manager application 28 is the host level application that accesses prompts, models, speaker dependent templates, and speaker verification templates from a database 30, and downloads this data via a resource bus 32 to DSPs 18. The prompts are digital voice data used to communicate with the caller. The speaker independent models identify the information represented by the first utterance spoken by a caller. For the example where the first utterance is an account number, then the speaker independent model is constrained by a digit grammar. The speaker dependent templates are caller dependent files formed from enrollment data representing the audio information given by each person of the group having access to the resource at issue. Thus, if 100 users have access to a given resource, then the corresponding database comprises 100 entries of such enrollment data. For reasons detailed below, each of these speaker dependent templates is associated with a corresponding speaker verification template in database 30. As noted in the Background Of The Invention Section, a speaker verification template is a relatively highly constrained model representation of a phrase, which is likely created from multiple utterances of that phrase and corresponding to a given person. The models include speaker independent models, speaker dependent models, and speaker verification models, all of which may be selected from various methodologies known in the art.

In resource domain 26, a DSP Task management function 34 notifies a speech task manager 36 about an impending recognition session. Speech task manager 36 performs system initialization 38 (such as initializing counters and parameters and initializing the DSP) and then proceeds to perform model initialization 40. In model initialization, user specific speech data from speaker dependent templates are converted into standard models. All of the models reside in a model region 42, which is a memory associated with the DSP performing the recognizing function.

After model initialization, DSP task management function 34 engages the DSP front end 44 to begin processing the data from the digital carrier 15. The DSP front end converts the digitized audio data from the digital carrier 15 into LPC (linear predictive code) vectors and places the LPC vectors into an LPC buffer 46. An HG (Hierarchical Grammar) alignment engine 48 begins concurrent processing of the LPC vectors from LPC buffer 46 and continues until an end point detection function 50 determines that the utterance is complete. A feature extraction function 52 creates the GSFs (Generalized Speech Features) from the LPC data in LPC buffer 46.

An HG alignment engine 48 is the core of the recognizer. This component matches the LPC based feature vectors from feature extraction function 52 to the models in model region 42. When alignment is complete, the recognition result is generated by speech task manager 36 and communicated through the DSP task management function 34 to call manager 28. Call manager 28 then decides on the next step of processing.

Figure 3:
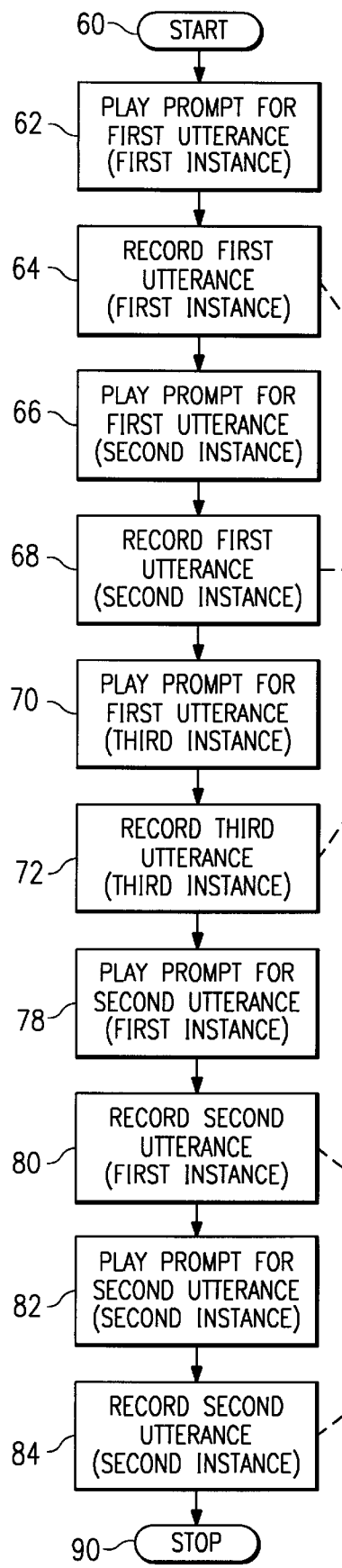
FIG. 3 illustrates a functional diagram of the enrollment methodology of speaker identification and verification.
Figure 3:
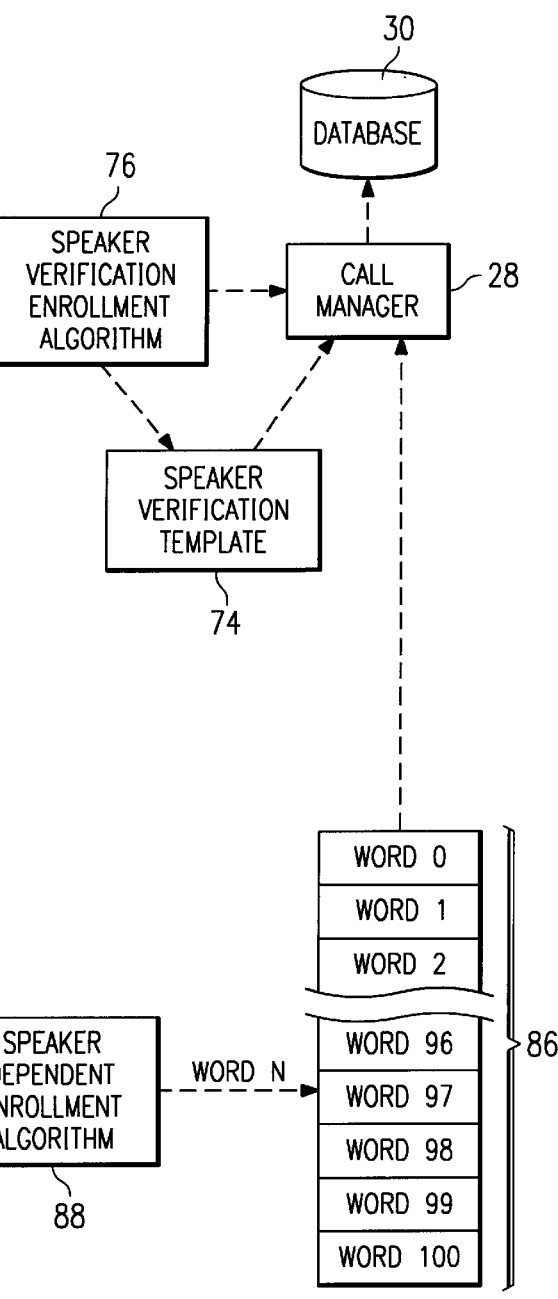

FIG. 3 illustrates a functional diagram of the enrollment methodology of speaker identification and verification of the preferred embodiment, where the diagram includes method steps and relates them to various items introduced above in connection with FIGS. 1 and 2. The method steps are shown generally along the left side of FIG. 3, with solid arrows indicating a flow along those steps and dashed arrows relating the steps to various items implicated by those steps. The method of FIG. 3 commences with a step 60. In step 60, the user invokes the system to perform the enrollment methodology. In the preferred embodiment, the actual step taken to invoke the system may be one of various actions. As one example, the user may dial a phone number such as placing a call from telephone 10. As another example, the user may transmit a request through an internet web page. In any event, after the user commences the enrollment process, the method continues to step 62.

Step 62 begins an enrollment process which proceeds from step 62 through step 72, and creates a speaker verification template 74. Specifically, in step 62 the method provides a prompt to the user to solicit a first instance of the first utterance introduced above, where recall that the first utterance is information identifying the resource to be accessed by persons in a group. In the preferred embodiment it is desired that this first utterance is sufficiently long in duration for reasons detailed later. In the example where the group resource is a long distance account, the prompt may ask, "please say your account number." Also in this context, note that in the preferred embodiment and under current technology the particular information solicited by the prompt (e.g., account number) is preferably of the type which will require an utterance of one to one and one-half seconds. The reason for this duration requirement is discussed later. In step 64, the method records the utterance provided by the user in response to the prompt of step 62. In the example of an account number, therefore, if the user stated "12345" in response to the prompt of step 62, then step 64 records (in the embodiment of FIG. 1) the arriving digitized representation of "12345", and it is provided to a speaker verification enrollment algorithm 76. In the preferred embodiment, speaker verification enrollment algorithm 76 may be selected by one skilled in the art from various processes constrained by speaker verification modeling. After step 64, the method performs steps 66 through 72 to cause the same operations of steps 62 and 64 to repeat twice more. Thus, step 66 again prompts the user for a second sample of the same information prompted in step 62, and step 68 records the response and directs it to verification enrollment algorithm 76. Similarly, step 70 prompts the user for a third sample of the same information prompted in step 62, and step 72 records the response and directs it to speaker verification enrollment algorithm 76. Once steps 62 through 72 are complete, speaker verification enrollment algorithm 76 processes the three recorded utterances and forms a resulting speaker verification template 74. Note in this regard that three samples are preferred to improve the quality of speaker verification template 74, yet in an alternative embodiment a different number of samples may be used. Through the operation of call manager 28, speaker verification template 74 is stored in database 30 for use as detailed later in connection with FIG. 4. In addition, the method continues to step 78.

Step 78 begins an enrollment process which proceeds from step 78 through step 84, and creates a speaker dependent template to be entered into a speaker dependent template table 86. Specifically, in step 78 the method provides a prompt to the user to solicit a first instance of the second utterance introduced above, where recall that the second utterance is information unique to the speaker, such as the caller's name. Thus, in the current example the prompt may ask, "please say your full name." In step 80, the method records the utterance provided by the user in response to the prompt of step 78. As an example used for the remainder of the document, assume then that the user states the name "Bob Smith." In step 80, therefore, the method records the "Bob Smith" A utterance, where once again in the embodiment of FIG. 1 this utterance arrives as a digitized and multiplexed signal. The recorded utterance is then provided to a speaker dependent enrollment algorithm 88. In the preferred embodiment, speaker dependent enrollment algorithm 88 may be selected by one skilled in the art from various processes for implementing speaker dependent modeling. After step 80, the method performs steps 82 and 84 to repeat the same operations of steps 78 and 80. Thus, step 82 prompts the user for a second sample of the same information prompted in step 80, and step 84 records the response and directs it to speaker dependent enrollment algorithm 88. Once steps 78 through 84 are complete, speaker dependent enrollment algorithm 88 processes the two recorded utterances and forms a resulting speaker dependent template (shown in FIG. 3 as one of Word 0 through Word 99). Note in this regard that two samples are preferred to improve the quality of speaker dependent template, yet in an alternative embodiment a different number of samples may be used. Next, call manager 28 stores the speaker dependent template in speaker dependent template table 86 which is located in database 30. In the preferred embodiment, speaker dependent template table 86 is sized to store up to an integer N number of speaker dependent templates, where in the example of FIG. 3 the integer N equals 100. Additionally, note that the each location within speaker dependent template table 86 provides an index which links the given location to a corresponding speaker verification template created from steps 62 through 72.

Step 90 merely concludes FIG. 3, thereby completing the user's enrollment, at which time there is then stored both a speaker dependent template for the group having access to the resource at issue and a speaker verification template for the user having just enrolled.

Figure 4:
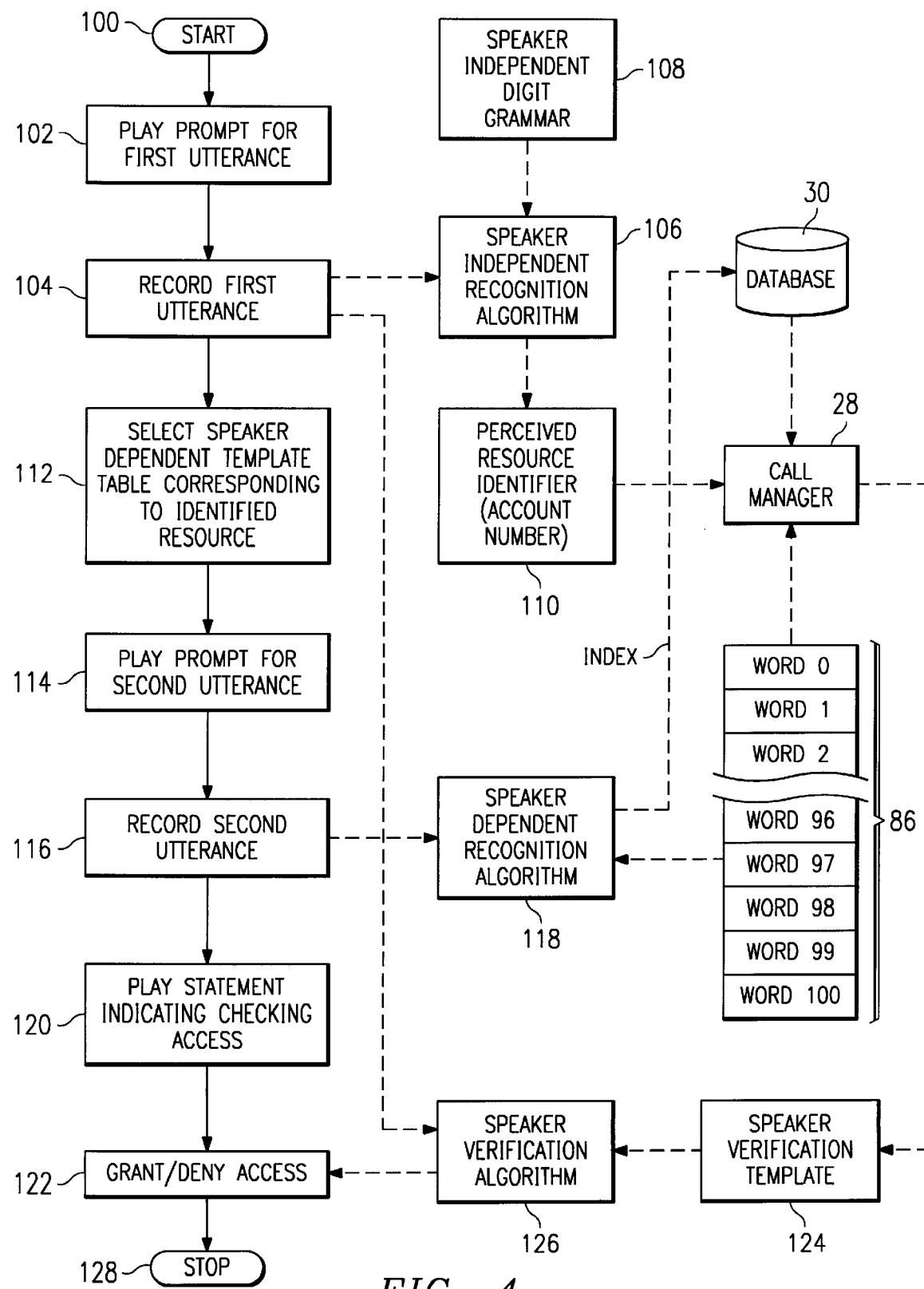
FIG. 4 illustrates a functional diagram of the recognition methodology of speaker identification and verification.

FIG. 4 illustrates a functional diagram of the methodology of speaker identification and verification of the preferred embodiment, where the diagram includes method steps and relates them to various items introduced above in connection with FIGS. 1 through 3. The method steps are shown generally along the left side of FIG. 4, where again solid arrows indicate a flow along those steps and dashed arrows relate the steps to various items implicated by those steps. The method of FIG. 4 commences with a step 100. In step 100, the user invokes the system to attempt an access to the resource at issue. In the preferred embodiment, the actual step taken to invoke the system may again be one of various actions such as dialing a phone number from telephone 10 or transmitting a request through an internet web page. After the user commences the access process, the method continues to step 102.

Step 102 begins an access process which in the preferred embodiment requires two utterances. With regard to the first of those utterances, in step 102 the method provides a prompt to the user to solicit the first utterance introduced above (i.e., the identifier of the resource to be accessed by persons in the authorized group). In the example where the group resource is a long distance account, the prompt of step 102 may ask, "please say your account number." In step 104, the method records the utterance provided by the user in response to the prompt of step 102. Again, in the case of the embodiment of FIG. 1, this utterance is a digitized and multiplexed signal. Also in step 104, the utterance is provided to a speaker independent recognition algorithm 106. In the preferred embodiment, speaker independent recognition algorithm 106 may be selected by one skilled in the art. As known in the art, speaker independent algorithms are not tightly constrained to a single speaker and operate to identify a speech pattern, independent of the speaker, based on modeling which typically is derived from hundreds if not thousands of speech samples. In the present example where the spoken utterance of step 104 is an account number, the digit grammar 108 constrains the recognition alignment against the speaker independent models to specific numeric strings. Given its inputs, speaker independent recognition algorithm 106 processes the utterance from step 104 in view of speaker independent digit grammar 108, and the result is a perceived resource identifier 110. In the example of an account number, therefore, if the user stated "12345" in response to the prompt of step 102, then a proper operation of speaker independent recognition algorithm 106 provides a result of "12345" as perceived resource identifier 110.

After perceived resource identifier 110 is determined, in step 112 call manager 28 selects the speaker dependent template table 86 corresponding to the resource identified by resource identifier 110. TO further illustrate this step 112, FIG. 4 depicts a dashed arrow from resource identifier 110 to call manager 28 and from call manager 28 to speaker dependent template table 86. To further appreciate this step by way of example, assume that database 30 is established to handle three different long distance accounts, where those three accounts include account number 12345, account number 34567, and account number 56789. Thus, for the example of the preceding paragraph where the perceived utterance is 12345, then step 112 provides the speaker dependent template table 86 corresponding to account number 12345. Before proceeding, note that only speaker independent recognition has thus far been involved in the access determination; therefore, any user having access to a workable resource identifier (e.g., account number) can successfully proceed to this point of the methodology of FIG. 4, at which time the speaker dependent template table 86 corresponding to the account number has been detected. Next, however, the method of FIG. 4 continues to step 114, after which it will be appreciated how further operations occur to grant only proper access to the resource identified in step 104.

Steps 114 and 116 are directed to the second of the two utterances preferably required of the user prior to accessing the desired resource. Particularly, in step 114 the method provides a prompt to the user to solicit the second utterance introduced above (i.e., something unique to the speaker, such as the caller's name). Continuing with the example of a person in a group accessing a long distance account, the prompt of step 102 may ask, "please say your full name." Using the same example as used in the case of the enrollment, assume now that Bob Smith is attempting to access the resource at issue and, thus, in response to the prompt of step 114 assume his utterance is "Bob Smith." In step 116, the method records the "Bob Smith" utterance provided by the user in response to the prompt of step 114, where once again in the embodiment of FIG. 1 this utterance arrives as a digitized and multiplexed signal.

Additionally in step 116, the recorded utterance is provided to a speaker dependent recognition algorithm 118, which also has as an input the speaker dependent template table 86 selected in step 112. In the preferred embodiment, speaker dependent recognition algorithm 118 may be selected by one skilled in the art. As known in the art, a speaker dependent algorithm is based on a fixed vocabulary that includes templates based on what the system expects to receive as voice signals. Also as known in the art, speaker dependent recognition is not designed to provide secure access like speaker verification, and generally allows 50% or higher impostor acceptance. An example of such a speaker dependent algorithm occurs for voice dialing, that is, where a user specifies the name of a person to be called and a system dials a number corresponding to the spoken name (i.e., so-called spoken name speed dialing). The specifics of such a system may be found in U.S. Patent Application Ser. No. 60/064,204, entitled "System For Enhanced Spoken Name Dialing," filed Nov. 4,1997, having the same inventors as the present document, and which is hereby incorporated herein by reference. One skilled in the art also will appreciate that the constraints of a speaker dependent algorithm are relatively greater than a speaker independent algorithm but relatively less than the constraints of a speaker verification algorithm. Given its inputs, speaker dependent recognition algorithm 118 processes the utterance from step 116 in view of all entries in speaker dependent template table 86 and selects the one of the N entries in table 86 which most closely matches the step 116 utterance. In the current example, therefore, and assuming proper identification by speaker dependent recognition algorithm 118, then the speaker dependent template selected corresponds to the "Bob Smith" utterance. For reasons more clear below, recall also that speaker dependent template table 86 includes an index for each entry. Thus, assume for the sake of example that the selected "Bob Smith" utterance has an index value of 35. This index value is used in the completion of the methodology, as appreciated from the following discussion of steps 120 and 122.

In step 120 the method provides a confirmation statement to the user that its right to access the resource is being confirmed. For example, the confirmation may state, "verifying" followed by a playback of a recording associated with the index value. Thus, if a speaker dependent recognition error occurs, the user is provided feedback to this effect. Accordingly, in the current example, the statement would be "verifying Bob Smith." At the same time, call manager 28 accesses from database 30 the speaker verification template having the same index as the speaker dependent template identified in response to step 116. In the current example, therefore, the speaker verification template for index number 35 is accessed, that is, the speaker verification template corresponding to Bob Smith. The selected speaker verification template is provided as one input to a speaker verification algorithm 126, which also receives as an input the recorded first utterance (e.g., "12345"). In the preferred embodiment, speaker verification algorithm 126 may be selected by one skilled in the art. As introduced earlier, a speaker verification algorithm is based on a single voice utterance and is tightly constrained to permit a fairly low speaker impostor acceptance. Given the relative high reliability of speaker verification algorithm 126, it analyzes its inputs to determine whether the first utterance satisfactorily matches the selected speaker verification template. If so, then the user is permitted access to the resource, whereas if not, then the user is denied access to the resource. Additionally, in either case, step 122 provides an indication to the user of the decision by way of another statement, such as "access granted" or "access denied." After this indication is made, the method concludes with step 128 after which another user may attempt access to the resource, once again commencing the method of FIG. 4 from step 100.

Given the above, one skilled in the art should appreciate various aspects and benefits of the preferred embodiment. For example, the integer number N of users each has access to a common resource using the speech analyses described above, and N has been empirically evaluated to provide satisfactory results even up to a number on the order of 100 such users. As another example, the considerations giving rise to the type and selection of information for the first and second utterances may now be appreciated given a review of both the enrollment and subsequent access procedures. With respect to the first utterance, note that it provides a relatively easily remembered piece of information, particularly as it represents the same information for all users (e.g., account number) and identifies the resource at issue. Moreover, as to its duration, note that the one to one and one-half second guideline, as is expected to be achieved using a multiple digit account number for the first utterance, provides a sufficient length sample for purposes of the speaker verification analysis of step 120. With respect to the second utterance, as the person's name it clearly is ascertainable to the user. Additionally, although in the preferred embodiment it may be of lesser duration than the first utterance, such an approach is acceptable since it is used only in a speaker dependent algorithm as opposed to a speaker verification algorithm. As still another benefit of the preferred embodiment, note now the contrast to the system which recall was provided in the Background Of The Invention section of this document. Specifically, in that alternative system, for each attempted access to a group resource, a voice sample is evaluated against speaker verification templates for all members of the group. In the inventive preferred embodiment, however, note that only a single speaker verification template is considered per attempted access. In contrast, therefore, the evaluation time and the possible complexity of the preferred embodiment are significantly less than the proposed system. As yet another benefit of the preferred embodiment, note that various substitutions, modifications or alterations could be made to the descriptions set forth above. For example, the specific information corresponding to each of the first and second utterances may be changed, particularly given the resource to be accessed. As another example, while FIG. 1 illustrates one system operable to implement the methodology of FIGS. 3 and 4, other systems also may be derived. Still further, while the preferred embodiment is described in the context of telephony, other applications may exist including those pertaining to apparatus control. Still other examples will be ascertainable by one skilled in the art and, thus, while the preceding embodiments have been described in detail, various changes could be made to the descriptions set forth above without departing from the inventive scope which is defined by the following claims.

What is claimed is:

1. A method of accessing at least one non-template resource accessible by a plurality of authorized persons and inaccessible by a plurality of unauthorized persons in response to speech processing, comprising the steps of:

receiving a signal representative of a first speech utterance from a first person, wherein the first speech utterance from the first person represents information;

responsive to the signal representative of the first speech utterance from the first person, the steps of:

selecting with a computer system a first table of speaker templates from a database comprising a plurality of tables;

wherein each of the plurality of tables corresponds to a different non-template resource and has a same type of speaker templates;

wherein each of the plurality of tables comprises entries corresponding to multiple persons authorized to access a non-template resource corresponding to the table; and wherein the first table is selected to correspond to the information represented by the first speech utterance from the first person;

wherein the first table comprises entries corresponding to persons authorized to access a first non-template resource; and determining with the computer system whether the first person is one of the plurality of authorized persons in response to the first table of speaker templates;

receiving a signal representative of a first speech utterance from a second person, wherein the first speech utterance from the second person represents the same information as the information represented by the first speech utterance from the first person; and responsive to the signal representative of the first speech utterance from the second person, the steps of:

selecting with the computer system a second table of speaker templates from the plurality of tables and to correspond to the information represented by the first speech utterance from the second person, wherein the second table comprises entries corresponding to persons authorized to access a second non-template resource; and determining with the computer system whether the second person is one of the plurality of authorized persons in response to the second table of speaker templates;

wherein the step of determining with a computer system whether the first person is one of the plurality of authorized persons comprises determining the information represented by the first speech utterance using speaker independent recognition;

wherein the first table of templates comprises a plurality of speaker dependent templates;

and further comprising the step of receiving a signal representative of a second speech utterance from the first person; and wherein the step of determining with a computer system whether the first person is one of the plurality of authorized persons further comprises the step of determining an index identing the first person by comparing the signal representative of the second speech utterance from the first person with each of the plurality of speaker dependent templates using speaker dependent recognition.

2. The method of claim 1 and further comprising the step of the computer system granting the first person access to the first non-template resource in response to the determining step determining that the first person is one of the plurality of authorized persons.

3. The method of claim 1 and further comprising the step of the computer system denying the first person access to the first non-template resource in response to the determining step determining that the first person is not one of the plurality of authorized persons.

4. The method of claim 1 and further comprising the computer system performing the steps of:
   granting the first person access to the first non-template resource in response to the determining step determining that the first person is one of the plurality of authorized persons; and
   denying the first person access to the first non-template resource in response to the determining step determining that the first person is not one of the plurality of authorized persons.

5. The method of claim 1 wherein the step of determining with a computer system whether the first person is one of the plurality of authorized persons further comprises the step of selecting a speaker verification template corresponding to the index.

6. The method of claim 5 wherein the step of determining with a computer system whether the first person is one of the plurality of authorized persons further comprises the step of comparing the selected speaker verification template with the signal representative of the first speech utterance from the first person using speaker verification.

7. The method of claim 6 wherein the information represented by the first speech utterance from the first person identifies the resource.

8. The method of claim 7 wherein the second speech utterance from the first person represents information and the information represented by the second speech utterance from the first person identifies a name of the first person.

9. The method of claim 1 and further comprising the step of receiving a signal representative of a second speech utterance from the first person.

10. The method of claim 9 wherein the step of determining with a computer system whether the first person is one of the plurality of authorized persons further comprises the step of determining an index identifying the first person by comparing the signal representative of the second speech utterance from the first person with each of a plurality of speaker dependent templates using speaker dependent recognition.

11. The method of claim 10 wherein the step of determining with a computer system whether the first person is one of the plurality of authorized persons further comprises the steps of:
   selecting a speaker verification template corresponding to the index; and
   comparing the selected speaker verification template with the signal representative of the first speech utterance from the first person using speaker verification.

12. The method of claim 11 wherein the step of determining with a computer system whether the first person is one of the plurality of authorized persons further comprises, prior to the step of determining an index identifying the first person, the step of:
   determining the information represented by the first speech utterance from the first person using speaker independent recognition; and
   wherein the first table comprising the plurality of speaker dependent templates is accessed in response to the information represented by the first speech utterance from the first person.

13. The method of claim 12 wherein the information represented by the first speech utterance from the first person identifies the resource.

14. The method of claim 13 wherein the second speech utterance from the first person represents information and the information represented by the second speech utterance from the first person identifies a name of the first person.

15. The method of claim 1:
   wherein the step of receiving a signal representative of the first speech utterance from the first person comprises receiving a telephony signal; and
   wherein the step of receiving a signal representative of the first speech utterance from the second person comprises receiving a telephony signal.

16. The method of claim 1 and further comprising the step of receiving a signal representative of a second speech utterance from the first person, wherein the second speech utterance from the first person represents information.

17. The method of claim 16 wherein the step of determining with a computer system whether the first person is one of the plurality of authorized persons is responsive to both the first speech utterance from the first person and the second speech utterance from the first person.

18. The method of claim 17 and further comprising, prior to the step of receiving the signal representative of the second speech utterance from the first person, the step of enrolling the first person, the enrolling step comprising:
   receiving a first signal from the first person representing a speech utterance from the first person, wherein the first signal represents the same information as the information represented by the second utterance from the first person; and
   forming a speaker dependent template in response to the first signal.

19. The method of claim 18 wherein the enrolling step further comprises:
   receiving a second signal from the first person representing a speech utterance from the first person, wherein the second signal represents the same information as the information represented by the second speech utterance from the first person; and
   wherein the step of forming the speaker dependent template comprises forming the speaker dependent template in response to the first signal from the first person and the second signal from the first person.

20. The method of claim 1 and further comprising, prior to the step of receiving the signal representative of the first speech utterance from the first person, the step of enrolling the first person, the enrolling step comprising:
   receiving a first signal from the first person representing a utterance from the first person, wherein the first signal represents the same information as the information represented by the first speech utterance from the first speaker; and
   forming a speaker verification template in response to the first signal from the first person.

21. The method of claim 20 wherein the enrolling step further comprises:
   receiving a second signal from the first person representing a speech utterance from the first person, wherein the second signal represents the same information as the information represented by the first speech utterance from the first person;
   receiving a third signal from the first person representing a speech utterance from the first person, wherein the third signal from the first person represents the same information as the information represented by the first speech utterance from the first person; and
   wherein the step of forming a speaker verification template comprises forming a speaker verification template in response to the first, second, and third signals from the first person.

22. A speaker identification and verifications system, comprising:
   at least one non-template resource accessible by a plurality of authorized persons and inaccessible by a plurality of unauthorized persons;
   circuitry for receiving a signal representative of a first speech utterance from a first person, wherein the first speech utterance from the first person represents information;
   circuitry for receiving a signal representative of a first speech utterance from a second person, wherein the first speech utterance from the second person represents the same information as the information represented by the first speech utterance from the first person;
   a computer system programmed to perform the steps of:
      responsive to the signal representative of the first speech utterance from the first person:
         selecting a first table of speaker templates from a database comprising a plurality of tables;
         wherein each of the plurality of tables corresponds to a different nontemplate resource and has a same type of speaker templates;
         wherein each of the plurality of tables comprises entries corresponding to multiple persons authorized to access a non-template resource corresponding to the table; and
         wherein the first table is selected to correspond to the information represented by the first speech utterance from the first person;
         wherein the first table comprises entries corresponding to persons authorized to access a first non-template resource; and
         determining whether the first person is one of the plurality of authorized persons in response to the first table of templates; and
      responsive to the signal representative of the first speech utterance from the second person:
         selecting a second table of templates from the plurality of tables and to correspond to the information represented by the first speech utterance from the second person, wherein the second table comprises entries corresponding to persons authorized to access a second non-template resource; and
         determining with the computer system whether the second person is one of the plurality of authorized persons in response to the second table of templates;
   wherein the computer system is further programmed such that the step of determining whether the first person is one of the plurality of authorized persons comprises determining the information represented by the first speech utterance using speaker independent recognition;
   wherein the first table comprises a plurality of speaker dependent templates;
   and further comprising the step of receiving a signal representative of a second utterance from the first person;
   wherein the computer system is further programmed such that the step of determining whether the first person is one of the plurality of authorized persons further comprises the step of determing an index identifying the first person by comparing the signal representative of the second speech utterance from the first person with each of the plurality of speaker dependent templates using speaker dependent recognition.

23. The system of claim 22 wherein the computer system is further programmed to perform the steps of:
   granting the first person access to the first non-template resource in response to the determining step determining that the first person is one of the plurality of authorized persons; and
   denying the first person access to the first non-template resource in response to the determining step determining that the first person is not one of the plurality of authorized persons.

24. The system of claim 22 wherein the computer system is further programmed such that the step of determining whether the first person is one of the plurality of authorized persons further comprises the step of selecting a speaker verification template corresponding to the index.

25. The system of claim 24 wherein the computer system is further programmed such that the step of determining whether the first person is one of the plurality of authorized persons further comprises the step of comparing the selected speaker verification template with the signal representative of the first speech utterance from the first person using speaker verification.

26. The system of claim 25 wherein the information represented by the first speech utterance from the first person identifies the resource.

27. The system of claim 26 wherein the second speech utterance from the first person represents information and the information represented by the second speech utterance from the first person identifies a name of the first person.

28. The method of claim 1 wherein the first table and the second table are a same table.

29. The method of claim 1 wherein the first table and the second table are different tables.

30. The system of claim 22 wherein the first table and the second table are a same table.

31. The system of claim 22 wherein the first table and the second table are different tables.

32. A method of accessing at least one non-template resource accessible by a plurality of authorized persons and inaccessible by a plurality of unauthorized persons in response to speech processing, comprising the steps of:
   receiving a signal representative of a first speech utterance from a first person, wherein the first speech utterance from the first person represents information;
   responsive to the signal representative of the first speech utterance from the first person, the steps of:
      selecting with a computer system a first table of speaker templates from a database comprising a plurality of tables;
         wherein each of the plurality of tables corresponds to a different non-template resource and has a same type of speaker templates;

wherein each of the plurality of tables comprises entries corresponding to multiple persons authorized to access a non-template resource corresponding to the table; and wherein the first table is selected to correspond to the information represented by the first speech utterance from the first person;

wherein the first table comprises entries corresponding to persons authorized to access a first nornontemplate resource; and determining with the computer system whether the first person is one of the plurality of authorized persons in response to the first table of speaker templates;

receiving a signal representative of a first speech utterance from a second person, wherein the first speech utterance from the second person represents the same information as the information represented by the first speech utterance from the first person; and responsive to the signal representative of the first speech utterance from the second person, the steps of:

selecting with the computer system a second table of speaker templates from the plurality of tables and to correspond to the information represented by the first speech utterance from the second person, wherein the second table comprises entries corresponding to persons authorized to access a second non-template resource; and determining with the computer system whether the second person is one of the plurality of authorized persons in response to the second table of speaker templates;

and further comprising the step of receiving a signal representative of a second speed utterance from the first person; and wherein the step of determining with a computer system whether the first person is one of the plurality of authorized persons further comprises the step of determining an index identifying the first person by comparing the signal representative of the second speech utterance from the first person with each of the plurality of speaker dependent templates using speaker depender recognition.

* * * * *